Jan. 12, 1960

H. BUCEK 2,921,178

METHOD AND APPARATUS FOR THE PERFORMANCE OF
TECHNICAL PROCESSES BY MEANS OF
ELECTRIC GLOW DISCHARGES

Filed Aug. 10, 1956

INVENTOR
HANS BUCEK

BY Joseph Hirschmann

ATTORNEY

United States Patent Office 2,921,178
Patented Jan. 12, 1960

2,921,178

METHOD AND APPARATUS FOR THE PERFORMANCE OF TECHNICAL PROCESSES BY MEANS OF ELECTRIC GLOW DISCHARGES

Hans Bucek, Zurich, Switzerland, assignor to Elektrophysikalische Anstalt Bernhard Berghaus, Vaduz, Liechtenstein Application August 10, 1956, Serial No. 603,449

4 Claims. (Cl. 219—121)

The present invention relates to a process and apparatus for the production of technical glow discharges for the treatment of workpieces and in particular to processes in which the glow discharge condition is varied during the process.

In such processes as are already known the workpieces to be treated are placed in a discharge vessel in which an electric glow discharge is maintained between the workpieces and suitable electrodes. In order to vary the discharge process periodically, the electric energy supplied is usually varied periodically at prefixed intervals by influencing the supply of current in the supply circuits.

Such glow discharge processes work with good efficiency in regard to their transformation of energy, usually over 90%, and are usually performed with energies of up to 100 kw. per discharge vessel. Accordingly the supply circuits must be influenced rhythmically in such a way that losses of energy are avoided as far as possible lest the overall efficiency of the process in question be reduced in an undesirable manner.

There are in existence for radar purposes and spot welding machines pulsing sources of good efficiency, but in these instances no current is supplied in the pauses between impulses and the duration of the impulse is usually only a few milliseconds. In the present case impulses of only 0.01 second may be desired occasionally, but usually impulses of substantially greater duration ranging up to several seconds are used for this kind of work. Furthermore, it is not desirable that the supply of energy for the glow discharge should be completely cut off in the pauses between impulses. On the contrary the discharge should be commonly switched periodically from a higher to a lower level of energy. Suitable current sources are not known for this purpose and in particular not for operations with direct current, for even grid-controlled rectifiers display poor efficiency of less than 50% when adjusted to a lower energy level. If, by way of example, in a glow discharge process with an impulse duration of 1 sec. and an impulse interval of 5 seconds, i.e. a ratio of 1:5, a current-source efficiency of 95% is accomplished at a high level of energy, and if at the lower level of energy the power is reduced to half value and a current-source efficiency of 50% is thereby attained, there results a mean efficiency of current supply of only about 63%. This deterioration of the efficiency through a poorly functioning current supply for the lower level of energy can therefore result in very undesirable losses when the power is of substantial magnitude.

The present invention does away with the highly undesirable disadvantages which normal current supply presents in regard to practical operation, and relates to a process and apparatus for the performance of such glow discharge processes as require their discharge condition to be varied periodically during the process. It is characteristic of these processes that the glow discharge is supplied by different sources of current at least in two of its various rhythmically consecutive discharge conditions.

The apparatus according to the present invention for the performance of the process is characterized by a switching arrangement that works periodically and by two different current sources which each operate within the range of their optimum efficiency and serve to supply alternately at least part of the workpieces connected as electrodes.

Two embodiments of the invention are described more fully below in conjunction with Figs. 1 to 3, in which.

Figure 1:
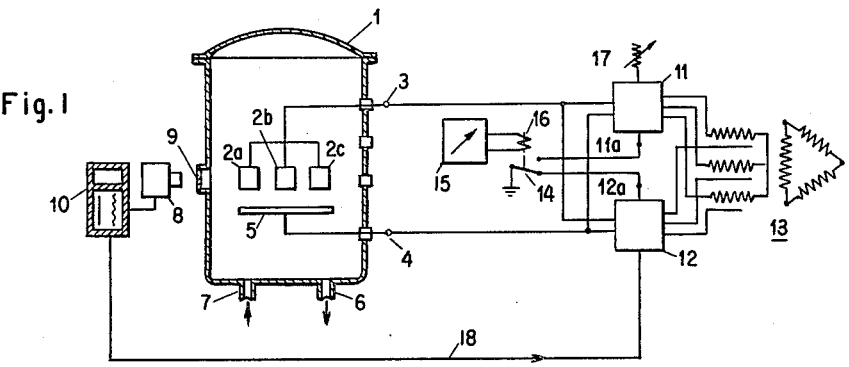
Fig. 1 is a basic circuit diagram of an embodiment of the apparatus according to the invention with two sources of direct current.

The embodiment of the apparatus according to Fig. 1 relates to a technical glow discharge process in which three workpieces 2a, 2b, and 2c in the discharge vessel 1 are treated in a glow discharge process supplied with direct current. The three workpieces 2a, 2b and 2c are all connected with the terminal 3 which is insulated from the metal discharge vessel 1, while the insulated lead-in 4 enters the discharge vessel 1 and connects with the counterelectrode 5. An exhaust pipe 6 is connected with a pump (not shown), whereas a certain quantity of gas enters the discharge vessel 1 through the pipe 7, so that a desired gas atmosphere at suitable pressure is created and maintained in the vessel. The temperature of the treated workpieces 2 is here, by way of example, registered by means of a radiation pyrometer through the window 9 in the discharge vessel and recorded by the registering and controlling unit 10.

The supply to the discharge vessel 1 is effected over terminals 3 and 4 by a current supply apparatus consisting of two direct current sources, by way of example, the two three-phase tube rectifiers 11 and 12 which are operated from the transformer 13 with the full secondary voltage and a partial voltage supplied from the taps on the secondary windings respectively. On the direct current side, the two rectifiers 11 and 12 are connected in parallel to the terminals 3 and 4 respectively of the discharge vessel 1, but only one of the two rectifiers 11 and 12 respectively is in operation at any time, this being effected over the control terminals 11a and 12a respectively by the influence of the grid control with which tube rectifiers are usually provided. For example a negative inverse voltage is applied to the control grids and this puts the rectifiers 11 and 12 out of action and only allows the rectifiers to become active on the control terminals 11a and 12a, respectively, becoming earthed. By means of a magnet winding 16 the throw-over switch 14 is actuated in a predetermined impulse rhythm fixed by the impulser 15 and earths the control terminals 11a and 12a, respectively, one at a time. The switch-over rhythm and the duration of the intervals for the high energy level (rectifier 11) and the lower energy level (rectifier 12) respectively of the glow discharge is adjustable at the impulser 15.

The two rectifiers 11 and 12 are adapted in their output to the two energy levels required and work with the optimum efficiency. The two current sources are, for instance, regulable by grid control in a limited range of adjustment of, by way of example, 10% of their nominal value in regard to their output, but the range of adjustment is limited in such a way that the two rectifiers 11 and 12 always work with nearly optimum efficiency. By adjusting the regulator 17, the rectifier 11 is set at the high energy level desired for the performance of the glow discharge process. The grid control of the rectifier 12 is influenced over the control lead 18 by the registering and regulating gear 10 in such a way that by altering the lower energy level of the discharge the mean energy supplied to the workpieces 2 ensures the maintenance of a predetermined temperature. The range of adjustment of the rectifier 12 always suffices to maintain the desired temperature of the workpieces 2, for the adjustment of the required mean energy can be regulated within wide limits by altering the intervals relative to each other by means of the adjustable impulser 15.

In this way an optimum efficiency is obtainable in the apparatus according to Fig. 1, for in both discharge intervals the supply is effected from a source of energy working with the highest possible efficiency. By adjusting the intervals relative to each other, i.e. by varying the so-called pulse relationship, the mean energy transformation of the glow discharge process can be varied within wide limits without this optimum efficiency being influenced to its detriment.

From the circuit diagram according to Fig. 1 it is quite plain that the present problem can in fact be solved only by the use of two separate sources of current. The obvious thing to do, it would seem, would be to use only one rectifier 11 and to operate it alternately with the full secondary voltage and the partial voltage supplied by the tap of secondary winding, respectively. But this would require a relatively complicated switching arrangement and demand a constant switch-over under load, which is highly undesirable in continuous operation and means heavy consumption. A switch-over on the primary side would not be less complicated and would moreover have to be effected under unfavourable conditions on account of the magnetizing current. Furthermore, the efficiency of a tube rectifier which, for example, is operated with only half the normal operating alternating voltage is usually worse than in standard operation.

Figure 2:
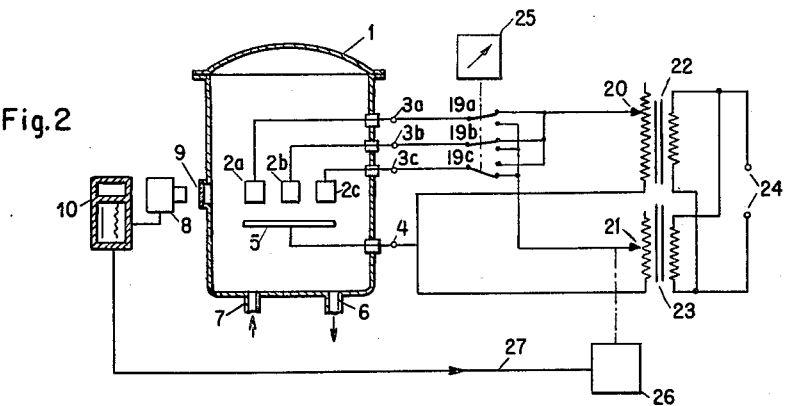
Fig. 2 is a basic circuit diagram of a further embodiment of the apparatus according to the invention with the workpieces switched over groupwise.

A further embodiment of the apparatus is reproduced in Fig. 2, and differs in regard to the discharge vessel 1 and the workpieces 2 from the apparatus according to Fig. 1 in that here each of the workpieces or each group of workpieces, as the case may be, 2a, 2b, 2c is connected with its own terminal 3a, 3b and 3c respectively. The supply to the terminals 3 is effected from the alternating current mains 24 over switches 19a, 19b and 19c respectively and the secondary taps 20 and 21 of the transformers 22 and 23 respectively. A controller 25 is provided for controlling switch 19, and the tap 21 can be adjusted over the lead 27 by the registering and controlling gear 10 through the operating device 26.

The transformer 22 is here dimensioned for the output and voltage corresponding to the higher energy level, the desired value of the energy transformation for the performance of the glow discharge process being adjusted through the tap 20. The transformer 23, on the other hand, is designed only for a lower, likewise adjustable energy level. Through the controller 25 the connection of the individual groups of workpieces 2a, 2b, 2c is effected to the two sources of current 22 and 23 respectively. In the illustrated position of switches 19, the workpiece groups 2a and 2b are for example connected to the transformer 22, i.e. they are operated with the high level of energy, whereas the workpiece group 2c is supplied from the transformer 23, i.e. has the lower level of energy.

Figure 3:
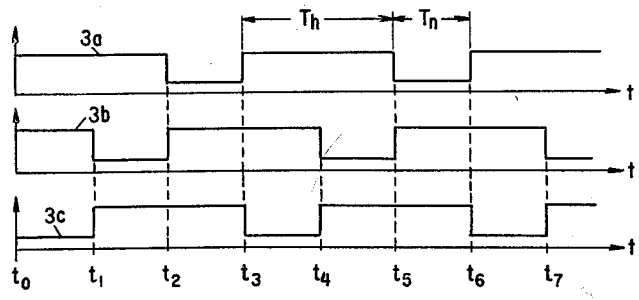
Fig. 3 is a diagram serving to explain the mode of operation of the apparatus according to Fig. 2.

The time sequence of the energy uptake of the three terminals 3a, 3b, 3c is indicated in Fig. 3, the situation shown in Fig. 2 corresponding to the interval $t_0 \ldots t_1$. In the following interval $t_1 \ldots t_2$ the workpiece group 2a is still operating with the high energy level, the workpiece 2b, however, now shows the lower energy level, whereas the workpiece group 2c has been brought to the high energy level. In the third interval $t_2 \ldots t_3$, the workpiece group 2a is working with the lower energy level, and the two workpiece groups 2b and 2c are being operated with the high energy level. After the point of time $t_3$ the cycle is repeated, so that the supply in the interval $t_3 \ldots t_4$ corresponds to that in the interval $t_0 \ldots t_1$.

As may be seen from Fig. 3, each workpiece group is operated during an interval $T_h$ with the high energy level and during the interval $T_n$ with the lower energy level, two workpiece groups being supplied at a time from transformer 22 and one from transformer 23, i.e. the load of the current sources and the mains is constant. But in this case the relationship of the intervals $T_h:T_n$ i.e. the pulse relationship, is no longer continuously variable. There exists merely the possibility of operating only one of the workpiece groups at a time with the lower level of energy, as shown in Figs. 2 and 3, or, on the other hand, connecting two workpiece groups at a time with the source of current 23 of lower capacity. That is to say, the pulse relationship $T_h:T_n$, as reproduced in Fig. 3, can have the value 2:1 or the value 1:2. With a total of $n$ separate groups of workpieces, the pulse relationship can be varied stepwise between the two extreme values $(n-1):1$ and $1:(n-1)$. Since accordingly the mean energy of the discharge can only be varied stepwise, the temperature regulation by the registering and regulating gear 10 must be effected by suitable control of the operating device 26 for the tap 21 on the transformer 23.

If, however, a constant loading of the transformers 22 and 23 and the mains supply at 24 is relinquished, the pulse relationship $T_h:T_n$ can also be varied continuously and the impulser 25 influenced correspondingly by the registering and regulating gear 10 to keep the temperature of the workpiece constant. This can usually be done with less consumption than a voltage regulation at the transformer 23.

The expressions "same kind of electrical energy" and "sources of current of the same kind," as employed in the claims, are to be understood to mean that the sources of energy all supply either direct current or alternating current.

Having now particularly described and ascertained the nature of my said invention and in what manner the same is to be performed, I declare that what I claim is:

1. Apparatus for the treatment of workpieces with an electric glow discharge, comprising a discharge chamber provided with means for supporting the workpieces therein, means for producing an electric glow discharge of varying intensity in said chamber and comprising a current source providing a high energy level supply, a device for adjusting the output of said source according to the desired degree of energy transformation of the glow discharge, a second current source providing a lower energy level supply, a temperature measuring device sensitive to the temperature of the workpiece and regulating the output of said second current source, a switch for connecting the chamber with one or the other of the current sources, and an impulser controlling the switch and settable to a constant selected switching rhythm for determining the duration of the intervals during which the chamber is fed by said current sources.

2. In an apparatus for the treatment of workpieces supported in a discharge chamber and connected with insulated current lead-ins, said workpieces being subjected in said chamber to an electrical glow discharge upon application to the current lead-ins of a voltage of sufficient magnitude, in combination with said discharge chamber and its current lead-ins, at least two separate sources of current for delivering current of the same kind, but at different energy rates, a switch between the current sources and said lead-ins, means for actuating the switch periodically at intervals for alternately connecting the said current sources with the current lead-ins, a controller for the current source of high capacity adapted to adjust the energy supply, and a temperature sensitive mechanism responsive to temperature changes in the discharge chamber and connected with the energy source of lower capacity, and operative to adjust the energy supply in dependence on the temperature, said switch actuating means comprising an impulser for operating the switch according to a predetermined cycle.

3. Apparatus for the treatment of workpieces with an electric glow discharge comprising a discharge chamber provided with means for supporting the workpieces therein, means for producing an electric glow discharge of varying intensity in said chamber and comprising a current source providing a high energy level supply, a second current source providing a lower energy level supply; a controller for regulating the energy output of the high energy level supply, a temperature responsive device which is sensitive to the temperature changes in the discharge chamber, a switch for connecting the chamber with one or the other of the current sources, an impulser controlling the switch and settable to a selected switching rhythm for determining the duration of the intervals during which the chamber is fed by said current sources, said temperature responsive device being connected to the impulser and regulating the switching rhythm in dependence on the temperature.

4. Process for the treatment of workpieces in an electric gas or glow discharge at a predetermined temperature by means of an ionic bombardment of the surfaces to be treated, comprising controlling rhythmically the energy supply to the gas or glow discharge and impinging the said surfaces, during intervals which follow each other in periodic sequence, with ions of higher and lower energy, applying the discharge energy alternatingly from current sources of higher and lower maximum outputs, sensing the temperature of the workpiece and so regulating the energy supply in response to such temperature that the average time value of the energy of two intervals following upon each other is maintained constant at a value corresponding to the predetermined temperature.

References Cited in the file of this patent

UNITED STATES PATENTS

| Re. 22,364 | Stansbury | Aug. 10, 1943 |
| 2,217,448 | Muller | Oct. 8, 1940 |
| 2,363,719 | Cooper et al. | Nov. 28, 1944 |
| 2,479,087 | Steward | Aug. 16, 1949 |

FOREIGN PATENTS

| 1,071,894 | France | Mar. 10, 1954 |